United States Patent
Park et al.

(10) Patent No.: US 7,450,652 B2
(45) Date of Patent: Nov. 11, 2008

(54) APPARATUS AND METHOD FOR RECEIVING SIGNALS IN AN OFDM COMMUNICATION SYSTEM

(75) Inventors: Cheol-Jin Park, Pohang-si (KR); Eung-Sun Kim, Suwon-si (KR); Jong-Hyeuk Lee, Seongnam-si (KR); Gi-Hong Im, Pohang-si (KR); Ho-Jin Kim, Seoul (KR)

(73) Assignees: Samsung Electronics Co., Ltd (KR); Postech Foundation (KR)

( * ) Notice: Subject to any disclaimer, the term of this patent is extended or adjusted under 35 U.S.C. 154(b) by 707 days.

(21) Appl. No.: 10/993,105

(22) Filed: Nov. 19, 2004

(65) Prior Publication Data

US 2005/0157802 A1 Jul. 21, 2005

(30) Foreign Application Priority Data

Nov. 20, 2003 (KR) ............. 10-2003-0082592

(51) Int. Cl.
*H04K 1/10* (2006.01)
(52) U.S. Cl. .............. 375/260; 375/316; 375/346; 375/348
(58) Field of Classification Search ......... 375/260, 375/348, 350, 224, 285, 346, 349, 229, 231, 375/242, 316
See application file for complete search history.

(56) References Cited

U.S. PATENT DOCUMENTS

| | | | | |
|---|---|---|---|---|
| 6,570,910 | B1 * | 5/2003 | Bottomley et al. | 375/148 |
| 6,744,821 | B1 * | 6/2004 | Van Acker et al. | 375/260 |
| 6,885,708 | B2 * | 4/2005 | Thomas et al. | 375/260 |
| 6,963,617 | B1 * | 11/2005 | Armour et al. | 375/260 |
| 7,356,105 | B1 * | 4/2008 | Nergis | 375/346 |
| 2004/0081263 | A1 * | 4/2004 | Lee et al. | 375/347 |

OTHER PUBLICATIONS

Hwang et al. "Iterative Cyclic Reconstruction for Coded Single-Carrier Systems with Frequency-Domain Equalization (SC-FDE)" IEEE, Apr. 2003.*
Suyama et al. "An OFDM Receiver Employing Turbo Equalization for Multipath Environments with Delay Spread Greater than the Guard Interval", IEEE, Apr. 2003.*

* cited by examiner

*Primary Examiner*—Mohammad Ghayour
*Assistant Examiner*—Sophia Vlahos
(74) *Attorney, Agent, or Firm*—The Farrell Law Firm, PC

(57) ABSTRACT

A receiving apparatus in an OFDM communication system, in which the receiving apparatus includes a serial-to-parallel converter that converts a serial signal received through an antenna to parallel signals. A pre-processor processes an nth symbol converted in the serial-to-parallel converter using an (n−1)th symbol and an (n+1)th symbol. A Fourier transformer Fourier-transforms the output of the pre-processor and an equalizer equalizes a Fourier-transformed signal. A deinterleaver deinterleaves an equalized signal, a decoder decodes a deinterleaved signal, and a parallel-to-serial converter converts parallel decoded signal to a signal stream.

15 Claims, 11 Drawing Sheets

APPARATUS AND METHOD FOR RECEIVING SIGNALS IN AN OFDM COMMUNICATION SYSTEM

PRIORITY

This application claims priority under 35 U.S.C. § 119 to an application entitled "Apparatus and Method for Receiving Signals in an OFDM Communication System" filed in the Korean Intellectual Property Office on Nov. 20, 2003 and assigned Serial No. 2003-82592, the contents of which are incorporated herein by reference.

BACKGROUND OF THE INVENTION

1. Field of the Invention

The present invention relates generally to an OFDM (Orthogonal Frequency Division Multiplexing) communication system, and in particular, to a receiving apparatus and method for efficiently recovering cyclicity between symbols in an OFDM communication system.

2. Description of the Related Art

To support data rates required for future-generation mobile communication services, OFDM has recently been considered as a fundamental technology for the future-generation mobile communication network.

FIG. 1 is a block diagram of a transmitter in a conventional OFDM system. Referring to FIG. 1, a channel coder 101 encodes input data d(k) and an interleaver 102 interleaves the coded data. A signal mapper 103 converts the interleaved signal c(i) to signal vectors X(n, 0:N−1). An IFFT (Inverse Fast Fourier Transformer) 104 outputs transmission signal vectors x(n, 0:N−1) for the input of X(n, 0:N−1). A CP (Cyclic Prefix) inserter 105 inserts a guard interval into x(n, 0:N−1). The resulting signal is transmitted through a parallel to serial (P/S) converter 106 and finally an antenna.

The OFDM system inserts a CP between every adjacent symbol pair in the time domain in order to handle multipath fading. Further, in order to completely eliminate inter-symbol interference (ISI) and inter-channel interference (ICI) caused by the multipath fading, the length of the CP must be longer than a channel impulse response (CIR).

FIG. 2 illustrates a structure of an nth symbol when a total number of sub-channels is 8 (N=8) and the CP length is 4. FIGS. 3 and 4 illustrate signal receptions when the CP is as long as the CIR and shorter than the CIR, respectively.

If a channel with a CIR length of 4 is defined as $h(D)=h_0+h_1D+h_2D^2+h_3D^3+h_4D^4$, then an nth signal is received as illustrated in FIG. 3.

In FIG. 3, the CP length is equal to the CIR length. r(r, 0:7) except for a CP, r(n, −4:−1) in the received symbol is a circular convolution of x(n, 0:7) and h(D) That is, r(n, −4:−1) is CP, such that it is removed from the received symbol and the remained part r(r, 0:7) becomes a circular convolution of x(n, 0:7) and h(D). Therefore, orthogonality is maintained between sub-channels, thereby avoiding ISI and ICI.

FIG. 4 illustrates the structure of a received symbol when the CIR length is 4 and the CP length is 2. Referring to FIG. 4, as many samples r(n, 0) and r(n, 1) as the difference between the CIR length and the CP length contain (n−1)th symbol components, thereby causing ISI, which is illustrated in the shaded squares of FIG. 4.

Because using a CP decreases the frequency efficiency of the OFDM system, many studies have been conducted on methods of efficiently eliminating ISI and ICI, while minimizing the use of the CP. As a result, iterative cancellation methods have been proposed such as residual ISI cancellation (RISIC) for canceling insufficient CP-caused interference.

According to the RISIC, recovery of the defective samples involves elimination of the ISI component and recovery of the CP. In this case, recovered samples r'(n, 0) and r'(n, 1) can be expressed as shown below in Equations (1) and (2).

$$r'(n,0)=r(n,0)\underline{-r_3(n-1,7)-r_4(n-1,6)+r_3(n,5)+r_4(n,4)} \quad (1)$$

$$r'(n,1)=r(n,1)\underline{-r_4(n-1,7)+r_4(n,5)} \quad (2)$$

The subtraction of $r_3(n-1, 7)$ and $r_4(n-1, 6)$ from the received signal r(n, 0) in Equation (1) and the subtraction of $r_4(n-1, 7)$ from the received signal r(n, 1) in Equation (2) are equivalent to ISI cancellation. The addition of $r_3(n, 5)$ and $r_4(n, 4)$ to r(n, 0) and the addition of $r_4(n, 5)$ to r(n, 1) are equivalent to CP recovery. The CP recovery is repeated along with detection of x(n, 0:7).

However, the conventional ISI cancellation method, such as the RISIC, effectively recovers a CP only if a CIR is shorter than an OFDM symbol period, that is, when interference power is much less than signal power, an effective CP recovery is possible.

Another shortcoming of the conventional ISI cancellation method is that because a current symbol is estimated and a CP is recovered using the symbol estimate, when a long channel delay leads to a high interference power, reduction of interference power by CP recovery cannot be expected due to errors in the symbol estimation.

While various methods have been proposed using techniques of SISO (Soft-Input Soft-Output) channel decoding, optimal detection filtering, and leaked signal energy spread to the next symbol to overcome the above shortcomings, a SISO channel decoder demonstrates a very slight performance improvement under an SER (Symbol Error Rate) and the optimal detection filtering requires a complex process of inversion of a channel transmission function matrix in an initial stage. Additionally, an ISI combiner using the leaked signal energy spread needs estimation of the next transmitted symbol.

SUMMARY OF THE INVENTION

An object of the present invention is to substantially solve at least the above problems and/or disadvantages and to provide at least the advantages below. Accordingly, an object of the present invention is to provide a receiving apparatus and a cyclicity recovering method for recovering a CP by pre-iteration processing an ISI-removed signal and a next received signal, thereby increasing ISI cancellation performance.

Another object of the present invention is to provide a receiving apparatus and a cyclicity recovering method for efficiently recovering a CP when a CIR is shorter than an OFDM symbol period in a system that does not use the CP.

The above and other objects are achieved by providing a receiving apparatus and method in an OFDM communication system. In the receiving apparatus, a serial-to-parallel converter converts a serial signal received through an antenna to parallel signals. A pre-processor processes an nth symbol converted in the serial-to-parallel converter using an (n−1)th symbol and an (n+1)th symbol. A Fourier transformer Fourier-transforms the output of the pre-processor and an equalizer equalizes a Fourier-transformed signal. A deinterleaver deinterleaves an equalized signal, a decoder decodes a deinterleaved signal, and a parallel-to-serial converter converts parallel decoded signal to a signal stream.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will be described in detail herein below with reference to the accompanying drawings. In the following description, well-known functions or constructions are not described in detail because they would obscure the invention in unnecessary detail.

Figure 1:
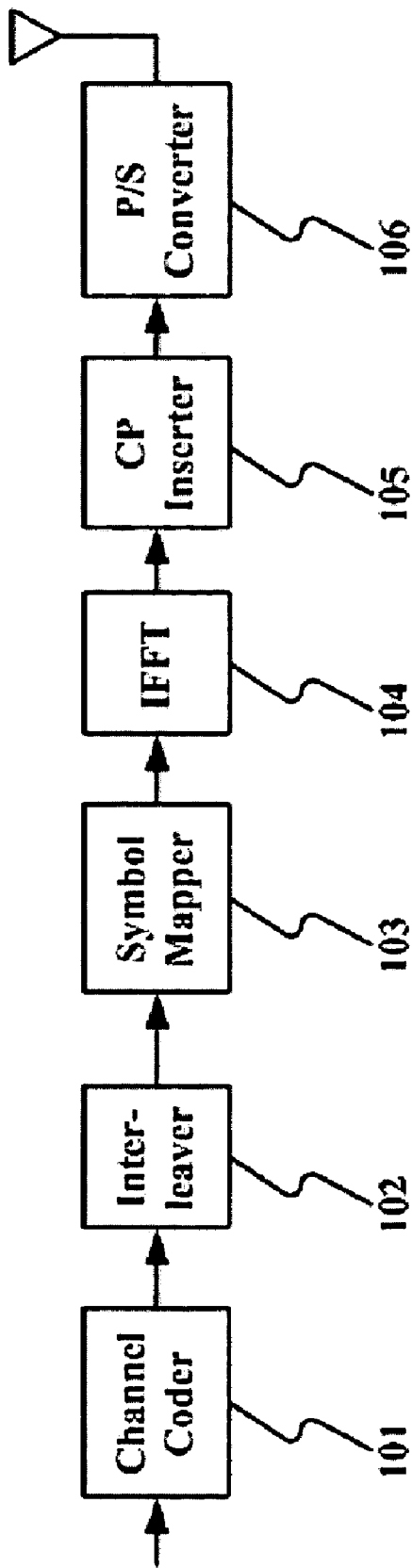
FIG. 1 is a block diagram of a transmitter in a conventional OFDM system.
Figure 2:
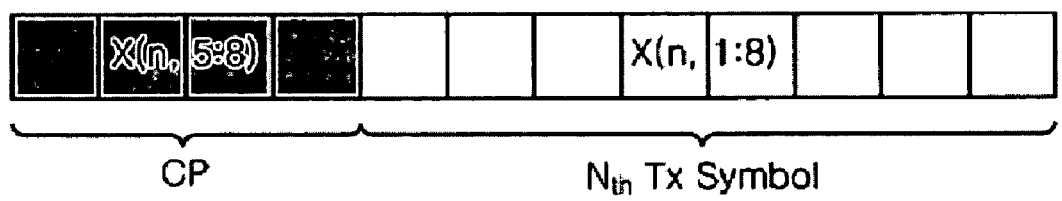
FIG. 2 illustrates a structure of a transmission symbol when the total number of sub-channels is 8 (N=8) and a CP length is 4.
Figure 3:
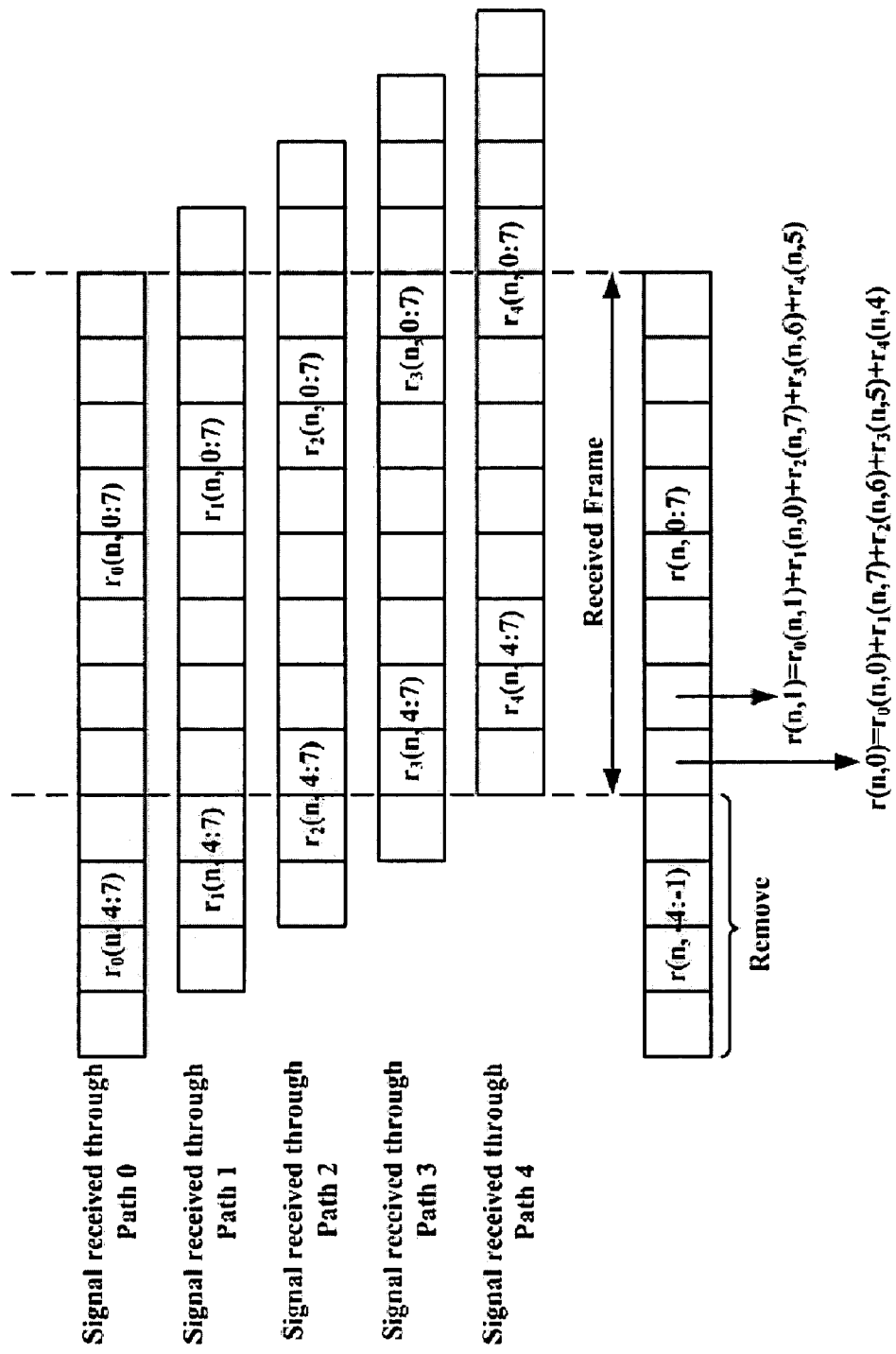
FIG. 3 illustrates a structure of a received symbol of the transmission symbol illustrated in FIG. 2 on a channel with a CIR length of 4.
Figure 4:
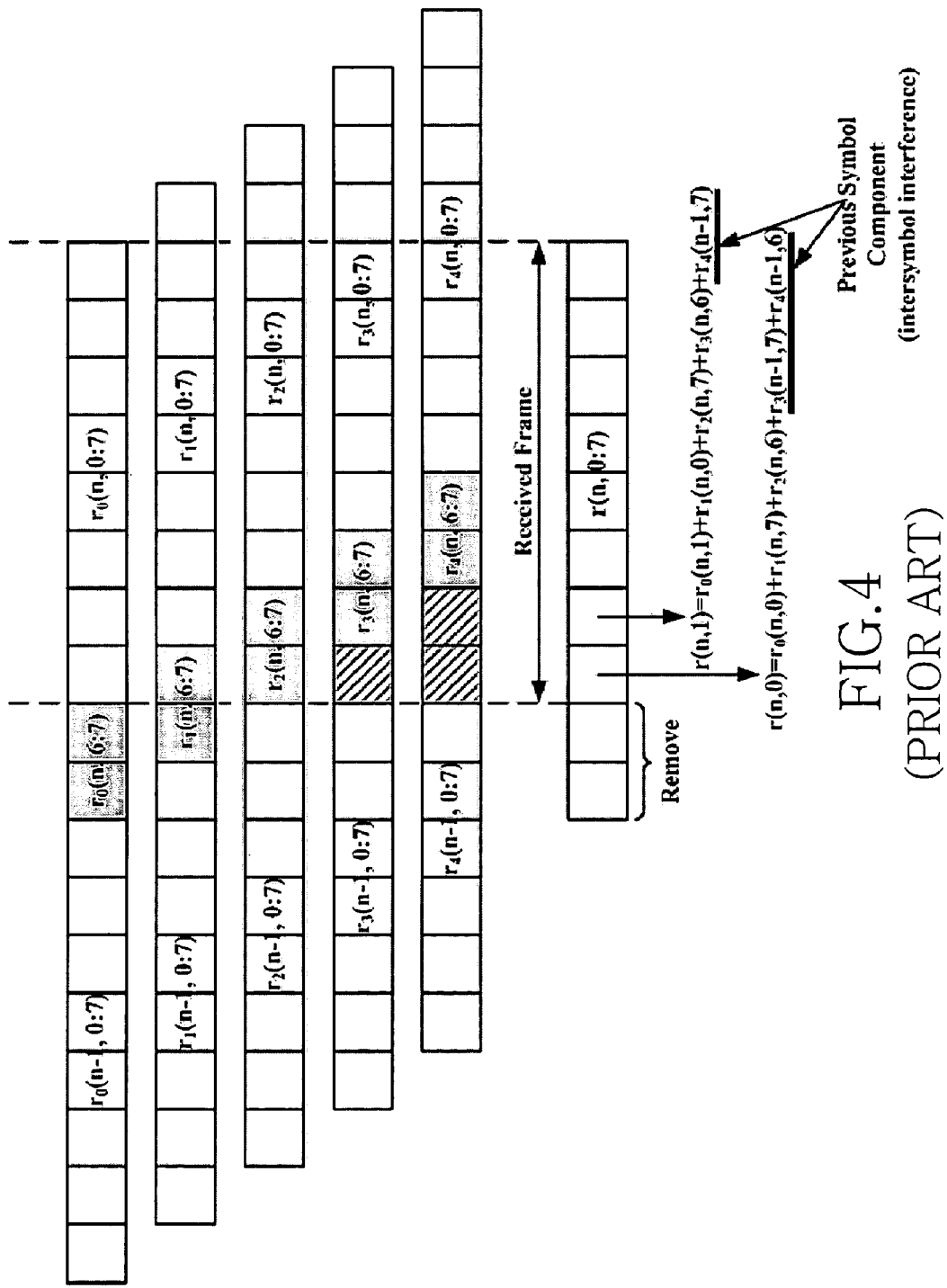
FIG. 4 illustrates a structure of a received symbol of the transmission symbol illustrated in FIG. 2 on a channel with a CIR length of 2.
Figure 5:
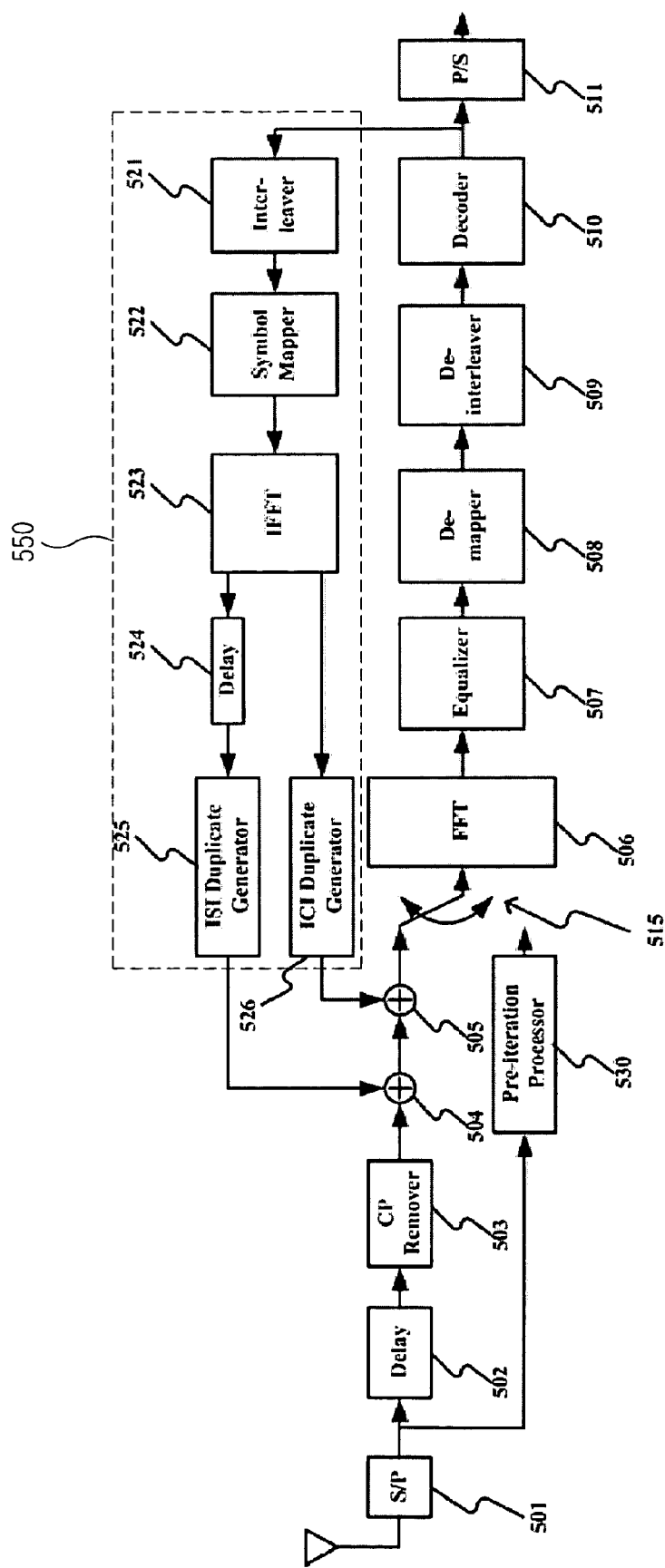
FIG. 5 is a block diagram of a receiving apparatus in an OFDM communication system according to a preferred embodiment of the present invention.

FIG. 5 is a block diagram of a receiving apparatus in an OFDM communication system according to a preferred embodiment of the present invention. Referring to FIG. 5, the receiving apparatus includes a serial-to-parallel (S/P) converter 501 for converting a serial signal received through an antenna to parallel signals, a first delay 502 for delaying the parallel signals by one symbol period, a CP remover 503 for removing a CP from the delayed signals, an ISI remover 504 for canceling ISI from an OFDM symbol received from the CP remover 503, an ICI remover 505 for canceling ICI from the ISI-removed OFDM symbol, an FFT (Fast Fourier Transformer) 606 for fast-Fourier-transforming the ISI- and ICI-free OFDM symbol, a one-tap equalizer 507 for equalizing the FFT signal, a demapper 508 for demapping the equalized signal, a deinterleaver 509 for deinterleaving the demapped signal, a SISO decoder 510 for decoding the deinterleaved signal, and a P/S converter 511 for converting the decoded parallel signals to a signal sequence.

The receiving apparatus further includes an interference canceling unit 550 for generating an ISI duplicate and an ICI duplicate from the output of the SISO decoder 510 to cancel the ISI and the ICI. Further, the interference canceling unit 550 outputs the ISI duplicate and the ICI duplicate to the ISI remover 504 and the ICI remover 505, respectively.

The interference canceling unit 550 includes an interleaver 521 for interleaving the output signal of the SISO decoder 510, a soft-symbol mapper 522 for modulating the interleaved signal, an IFFT 523 for inverse-fast-Fourier-transforming the modulated symbol, a second delay 524 for delaying the IFFT signal by one symbol period, an ISI duplicate generator 525 for generating an ISI duplicate from the delayed signal and outputting the ISI duplicate to the ISI remover 504, and an ICI duplicate generator 526 for generating an ICI duplicate from the IFFT signal and outputting the ICI duplicate to the ICI remover 505.

Also, the receiving apparatus further includes a pre-iteration processor 530 for pre-iteration processing the output signal of the ISI remover 504 and the output signal of the S/P converter 501 and outputting the pre-processed signal to the FFT 506.

The pre-iteration processor 530 recovers a CP by applying a signal component of an nth symbol period included in a signal r(n+1, −G:N−1) received during an (n+1)th symbol period after the S/P conversion to the output of the ISI remover 504 and provides a signal for the nth symbol period with the recovered CP to the FFT 506.

In an embodiment of the present invention, the receiving apparatus further includes a switch 515 for selectively switching the outputs of the ICI remover 505 and the pre-iteration processor 530 to the FFT 506.

When the number of pre-iteration processes in the pre-iteration processor 530 is 1, the switch 515 switches the output of the pre-iteration processor 530 to the FFT 560. When the number of pre-iteration processes is larger than 1 and less than a predetermined number, the switch 515 switches the output of the ICI remover 505 to the FFT 506. When the number of pre-iteration processes is equal to or greater than the predetermined number, the pre-iteration process is terminated.

Figure 6:
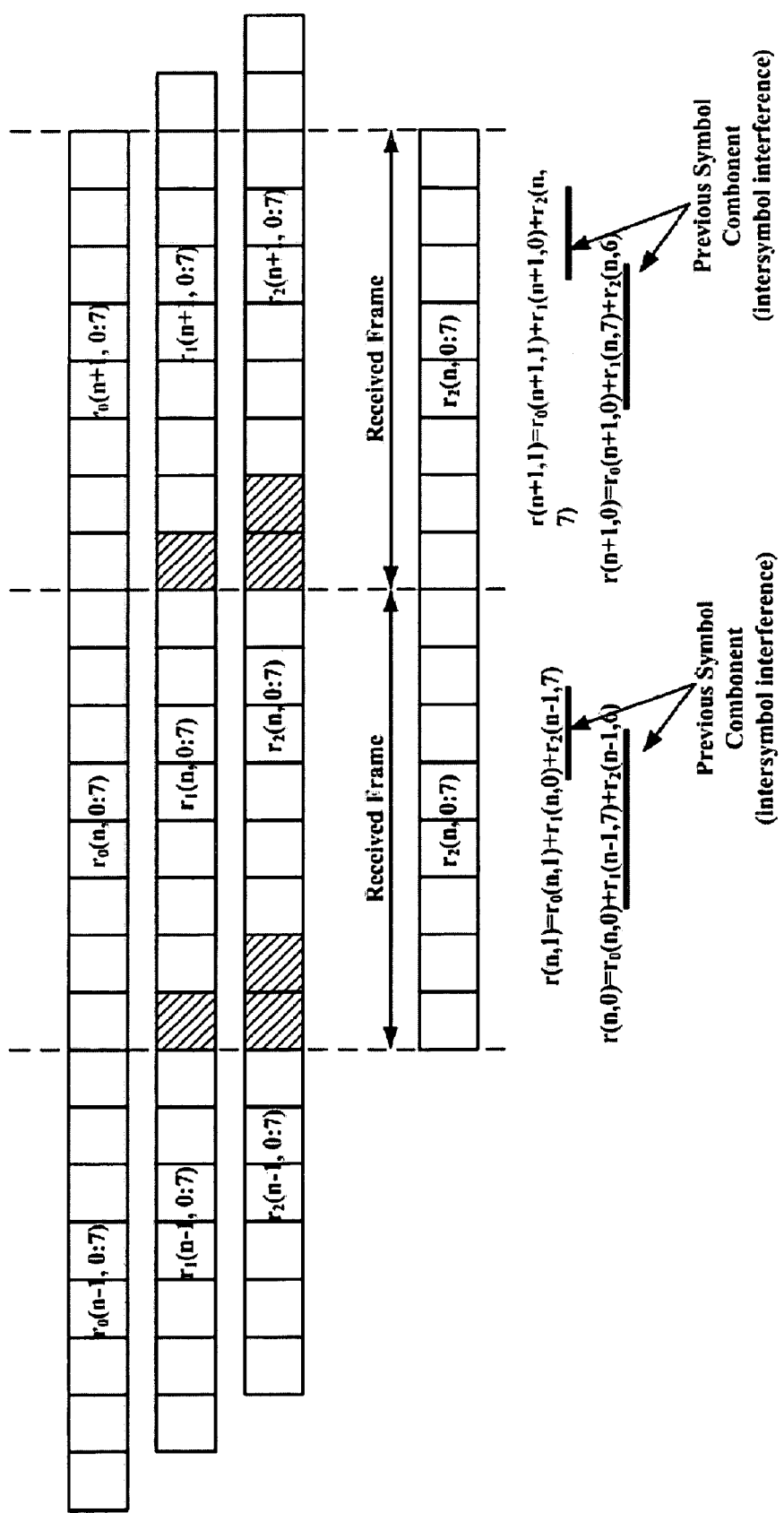
FIG. 6 illustrates a structure of a signal received in the receiving apparatus illustrated in FIG. 5.

FIG. 6 illustrates the structure of a signal received at the receiving apparatus according to a preferred embodiment of the present invention. It is assumed herein that a CIR length is 2 (L=2), a CP length is 0 (G=0), and the number of sub-channels is 8 (N=8). The CP recovery is based on the idea that signal components of an nth symbol period required for CP recovery are found in (L−G) samples of a signal received during an (n+1)th symbol period.

Referring to FIG. 6, supposing that samples affected by ISI are r(n, o) and r(n, 1), perfect channel knowledge is acquired, and no errors occur in coding of the previous symbol, ISI cancellation is represented as shown below in Equations (3) and (4).

$$\tilde{r}^{(0)}(n,0)=r(n,0)-h_1x(n-1,7)-h_2x(n-1,6)=h_0x(n,0)=r_0(n,0) \quad (3)$$

and $$\tilde{r}^{(0)}(n,1)=r(n,1)-h_2x(n-1,7)=h_0x(n,1)+h_1x(n,0)=r_0(n,1)+r_1(n,0) \quad (4)$$

To recover a CP after the ISI cancellation, $h_1x(n,7)+h_2x(n,6)=r_1(n,7)+r_2(n,6)$ must be added to the ISI-removed received signal $\tilde{r}^{(0)}(n,0)$, and $h_2x(n,7)=r_2(n,7)$ must be added to the ISI-removed received signal $\tilde{r}^{(0)}(n,1)$. The information is included in r(n+1,0) and r(n+1,1), respectively. Considering that r(n+1,0) and r(n+1,1) also include information about the (n+1)th symbol, r(n+1,0) and r(n+1,1) are added to $\tilde{r}^{(0)}(n,0)$ and $\tilde{r}^{(0)}(n,1)$, with appropriate weights, to thereby minimize an average interference power. This is shown below in Equations (5) and (6).

$$\bar{r}^{(0)}(n,0)=\tilde{r}^{(0)}(n,0)+w(0)\times r(n+1,0) \quad (5)$$

and $$\bar{r}^{(0)}(n,1)=\tilde{r}^{(0)}(n,1)+w(1)\times r(n+1,1) \quad (6)$$

The process of minimizing the average interference power is called pre-iteration processing (PIP).

Assuming the transmission samples are mutually independent, weights w(0) and w(1), which minimize the average interference power, are determined by Equations (7) and (8).

$$w(0) = \frac{\sum_{i=1}^{2} |h_i|^2}{\sum_{i=0}^{2} |h_i|^2} \quad (7)$$

$$w(1) = \frac{\sum_{i=2}^{2} |h_i|^2}{\sum_{i=0}^{2} |h_i|^2} \quad (8)$$

Figure 7:
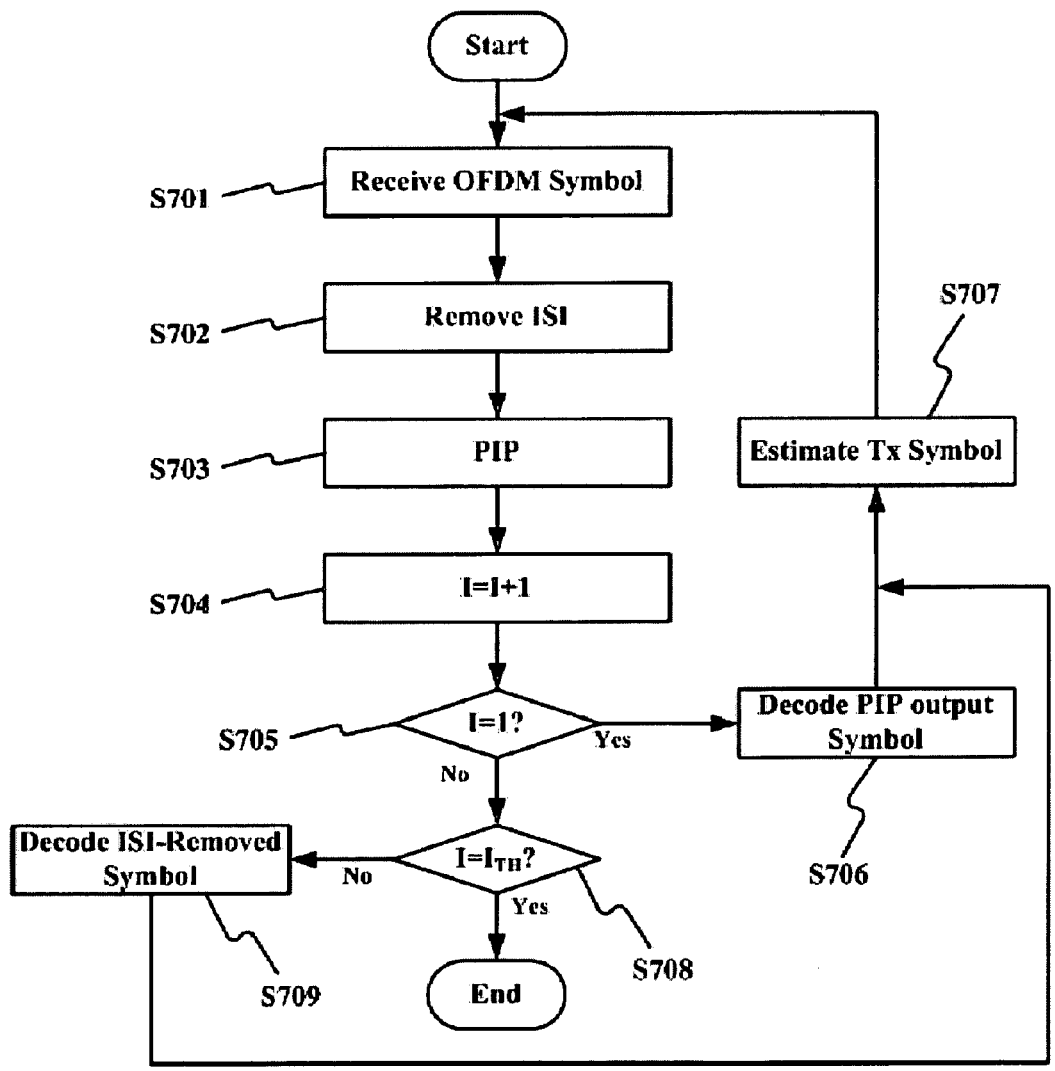
FIG. 7 is a flowchart illustrating a data receiving operation in the OFDM communication system according to the preferred embodiment of the present invention.

FIG. 7 is a flowchart illustrating a CP recovering method according to a preferred embodiment of the present invention. Referring to FIG. 7, the receiving apparatus receives an nth OFDM symbol, delays the nth OFDM symbol by one symbol period, and then receives an (n+1)th OFDM symbol in step S701. In step S702, the receiving apparatus cancels ISI from the nth OFDM symbol using the estimates and channel information of the nth and (n−1)th OFDM symbols. The ISI-removed signal is expressed as shown below in Equation (9).

$$\tilde{r}^{(0)}(n,k) = \begin{cases} r(n,k) - \sum_{i=G+k+1}^{L} h_i \hat{x}(n-1, N+G+k-i) & 0 \le k < L-G \\ r(n,k) & L-G \le k < N \end{cases} \quad (9)$$

After the ISI cancellation from the nth OFDM symbol, the receiving apparatus subtracts the product of an nth OFDM symbol component in an (n+1)th OFDM symbol and a weight w(k) from the nth OFDM symbol, thereby recovering the cyclicity in step S703. The cyclicity-recovered signal is obtained as shown in Equation (10), $$\tilde{r}^{(0)}(n,k) = \begin{cases} \tilde{r}^{(0)}(n,k) - w(k) \times r(n+1,k) & 0 \le k < L-G \\ r(n,k) & L-G \le k < N \end{cases} \quad (10)$$

$$\text{where } w(k) = \frac{\sum_{i=G+k+1}^{L} |h_i|^2}{\sum_{i=0}^{L} |h_i|^2}.$$

The cyclicity recovery is a PIP, as stated earlier. Each time the PIP is performed, a PIP indicator I is incremented by one in step S704.

In step S705, the receiving apparatus determines if I is 1. If I=1, the receiving apparatus performs FFT, equalization, deinterleaving, and decoding on the PIP output symbol $\tilde{r}^{(iter)}(n,0: N-1)$ in step S706 and estimates a transmission signal $\hat{x}^{(iter)}(n,0: N-1)$ from the decoded signal in step S707.

However, if I≠1, the receiving apparatus determines whether I is a predetermined iteration number $I_{th}$ in step S708. If I≠$I_{th}$, the receiving apparatus performs FFT, equalization, deinterleaving, and decoding on the ISI-removed $\tilde{r}^{(iter)}(n,0: N-1)$ in step S709 and estimates a transmission signal $\hat{x}^{(iter)}(n,0: N-1)$ from the decoded signal in step S707.

If I=$I_{th}$, the receiving apparatus terminates the CP recovery algorithm.

Figure 8:
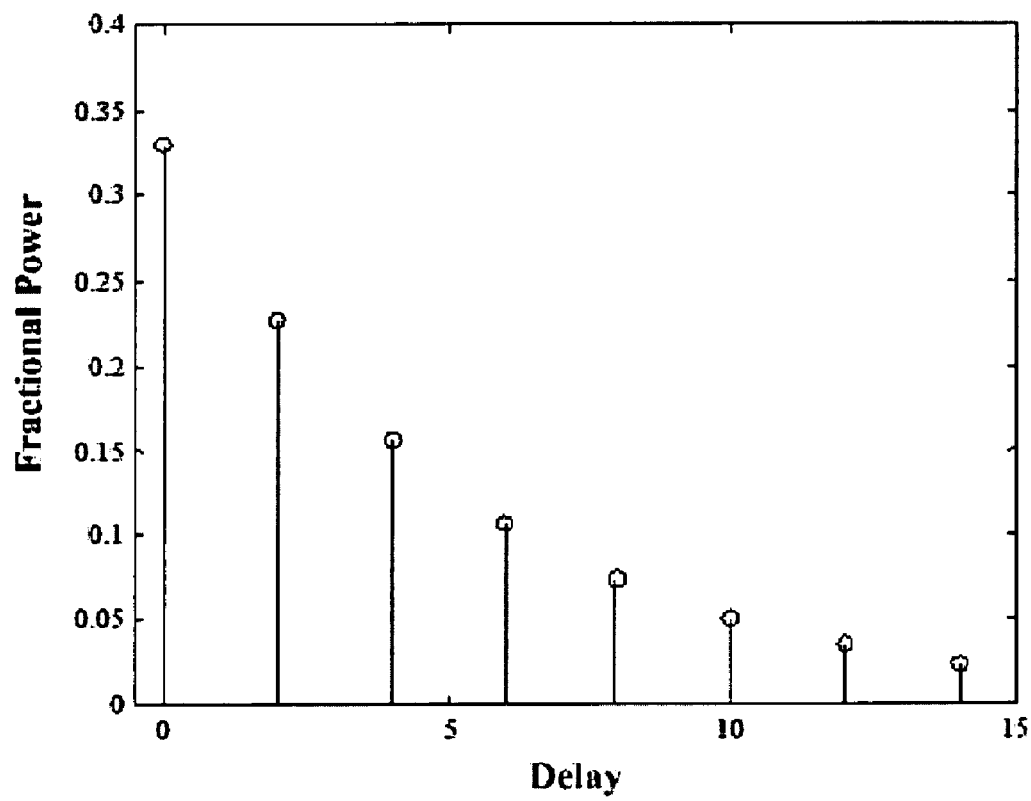
FIGS. 8 and 9 are graphs illustrating channel environments under which simulations are performed to assess the performance of the receiving apparatus using a CP recovery method of the present invention.
Figure 9:
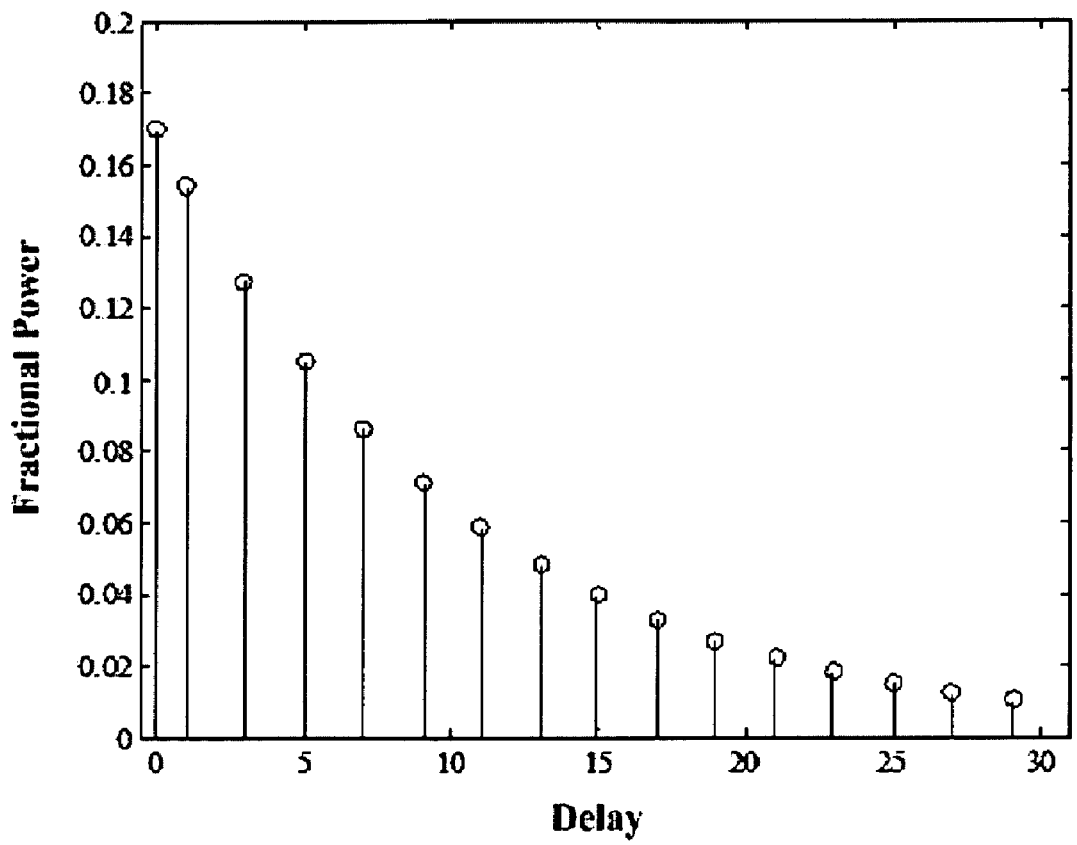
Figure 10:
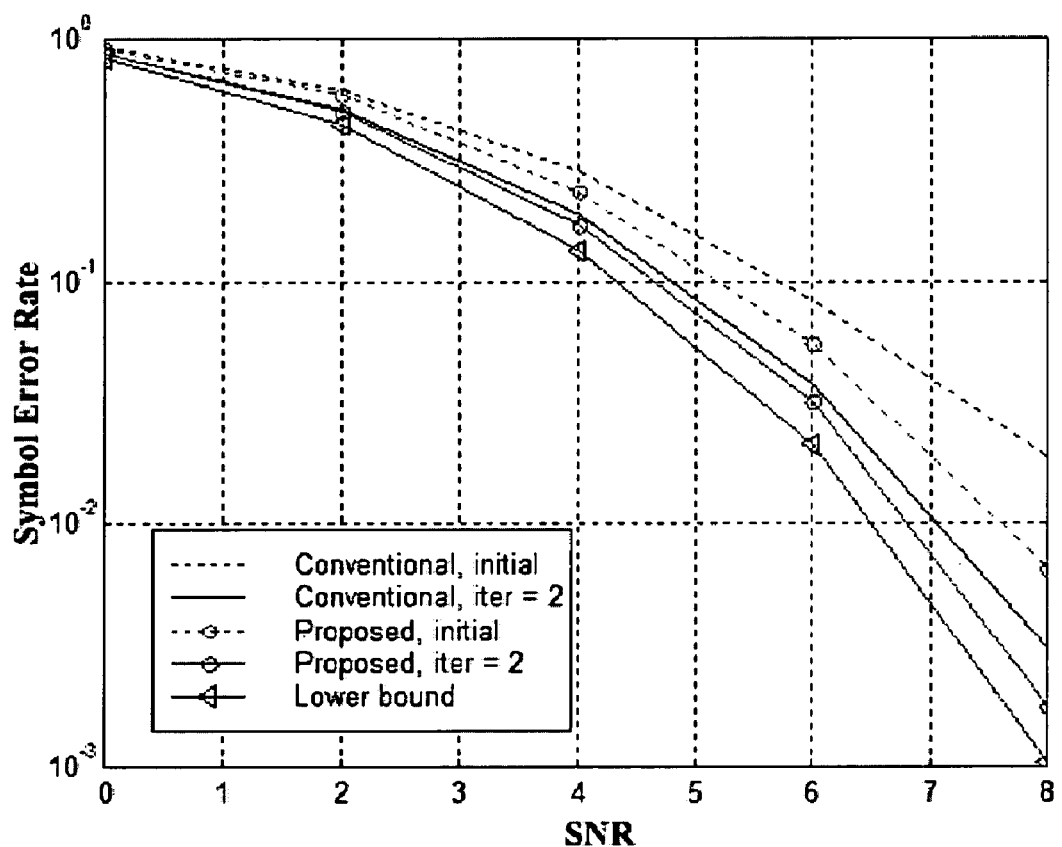
FIGS. 10 and 11 are graphs illustrating a performance of the receiving apparatus of the present invention under the channel environments illustrated in FIGS. 8 and 9.
Figure 11:
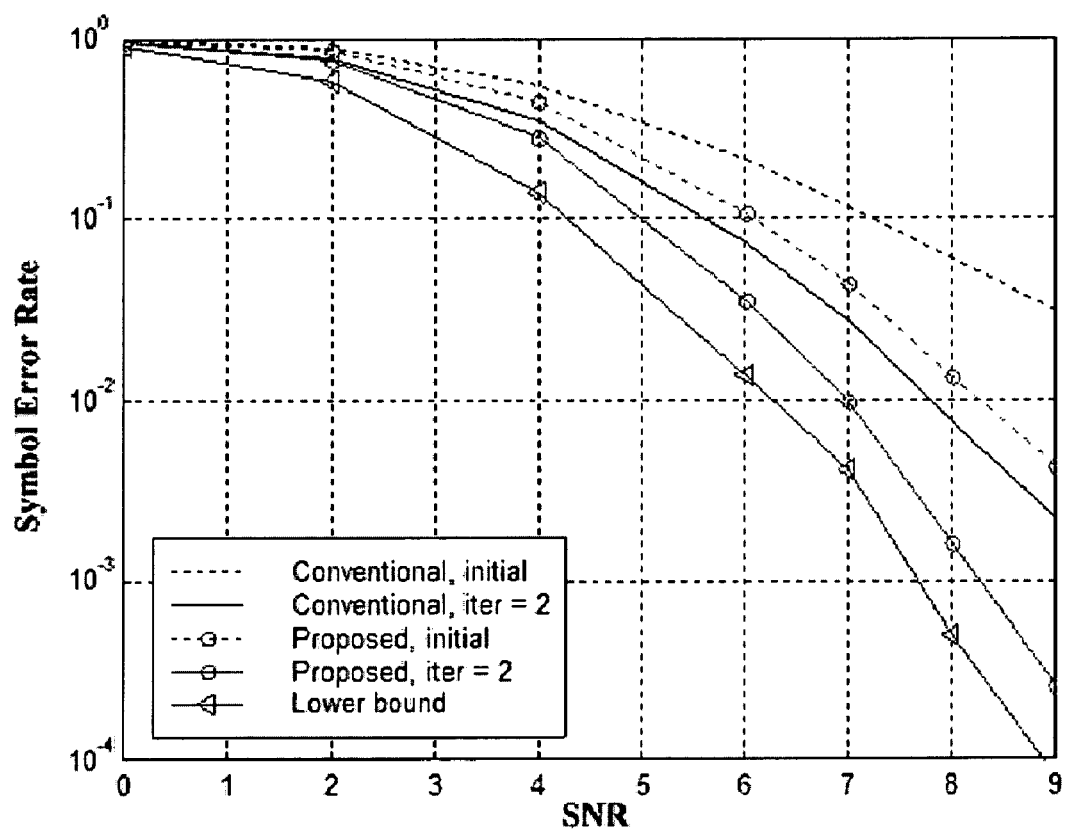

FIGS. 8 and 9 are graphs illustrating channel environments under which simulations are performed to assess the performance of the receiving apparatus when the CP recovery method is used according to the present invention. FIGS. 10 and 11 are graphs illustrating the performance of the receiving apparatus of the present invention under the channel environments illustrated in FIGS. 8 and 9. The simulations were performed using the conventional CP recovery method and the inventive CP recovery method in a coded-OFDM system under the conditions of N=64, G=0, and a coding rate ½-convolutional code with K=7.

Referring to FIGS. 10 and 11, it is noted that the inventive CP recovery offers better SER performance than the conventional CP recovery under the channel environments having delay characteristics illustrated in FIGS. 8 and 9.

In accordance with the present invention as described above, the CP of an nth received symbol is recovered using an estimate of an (n−1)th received symbol and an nth symbol component included in an (n+1)th received symbol. Therefore, the inventive CP recovery method enables reliable CP recovery.

Additionally, efficient recovery of the cyclicity of a symbol through PIP, irrespective of a CP length, maximizes channel capacity and effectively removes ISI in the inventive CP recovery method.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A receiving apparatus in an orthogonal frequency division multiplexing (OFDM) communication system, comprising:
    a serial-to-parallel converter for converting a received serial signal to parallel signals comprising at least two successive symbols;
    a pre-processor for processing an nth symbol using an (n−1)th symbol and an (n+1)th symbol;
    a Fourier transformer for Fourier-transforming the output of the pre-processor;
    an equalizer for equalizing a Fourier-transformed signal;
    a deinterleaver for deinterleaving the equalized signal;
    a decoder for decoding the deinterleaved signal; and
    a parallel-to-serial converter for converting the parallel decoded signal to a signal stream
    wherein the pre-processor recovers a cyclic prefix of the nth symbol using the (n−1)th symbol and the (n+1)th symbol, if the nth symbol is transmitted without the cyclic prefix.

2. The receiving apparatus of claim 1, wherein the pre-processor comprises:
    a delay for delaying the nth symbol by at least one symbol period;
    an inter-symbol interference (ISI) remover for removing ISI from a delayed signal;
    an inter-channel interference (ICI) remover for removing ICI from an ISI-removed signal;
    a pre-iteration processor for recovering cyclicity of the ISI-removed signal using the (n+1)th symbol; and a switch for selectively switching the outputs of the ICI remover and the pre-iteration processor to the Fourier transformer.

3. The receiving apparatus of claim 2, wherein the pre-processor further comprises a cyclic prefix (CP) remover for removing a CP from the delayed signal received from the delay.

4. The receiving apparatus of claim 2, wherein the pre-processor further comprises a feedback unit for processing the output of the decoder and providing information needed for the ISI remover and the ICI remover.

5. The receiving apparatus of claim 2, wherein the pre-iteration processor extracts an nth symbol component from the (n+1)th symbol and adds the nth symbol component to the ISI-removed signal.

6. The receiving apparatus of claim 2, wherein the switch switches the output of the pre-iteration processor to the Fourier transformer, if a number of pre-iteration processes in the pre-iteration processor is 1.

7. The receiving apparatus of claim 2, wherein the switch switches the output of the ICI remover to the Fourier transformer, if a number of pre-iteration processes in the pre-iteration processor is larger than 1 and less than a predetermined value.

8. The receiving apparatus of claim 7, wherein if the number of pre-iteration processes is at least equal to the predetermined value, the pre-iteration processor ends pre-iteration processing.

9. A data receiving method for a receiving apparatus in an orthogonal frequency division multiplexing (OFDM) communication system, comprising the steps of:

receiving at least two successive symbols;
pre-processing an nth symbol by recovering a cyclic prefix of the nth symbol using an (n−1)th symbol and an (n+1)th symbol, if the nth symbol is transmitted without the cyclic prefix;
Fourier-transforming the pre-processed signal; and
recovering a transmission signal by equalizing, deinterleaving, and decoding the Fourier-transformed signal.

10. The data receiving method of claim 9, wherein the pre-processing step comprises the steps of:
removing ISI from the nth symbol;
removing ICI from the ISI-removed signal;
recovering cyclicity of the ISI-removed signal using the (n+1)th symbol; and
selecting one of the ICI-removed signal and the cyclicity-recovered signal for Fourier transformation.

11. The data receiving method of claim 10, wherein the pre-processing step further comprises the step of removing a cyclic prefix (CP) from the nth symbol.

12. The data receiving method of claim 10, wherein the pre-processing step further comprises the step of incrementing a number of preprocesses by 1, each time the cyclicity is recovered.

13. The data receiving method of claim 12, wherein the cyclicity-recovered signal is selected, if the number of pre-processes is 1.

14. The data receiving method of claim 12, wherein the ICI-removed signal is selected, ifs number of pre-processes is larger than 1 and less than a predetermined value.

15. The data receiving method of claim 14, further comprising the step of ending the pre-processing, if the number of pre-processes is at least equal to the predetermined value.

* * * * *